(12) United States Patent
Tolbert

(10) Patent No.: US 9,718,446 B1
(45) Date of Patent: Aug. 1, 2017

(54) WHEEL BRUSH FOR A WHEELCHAIR

(71) Applicant: Billy Tolbert, Evergreen, AL (US)

(72) Inventor: Billy Tolbert, Evergreen, AL (US)

(*) Notice: Subject to any disclaimer, the term of this patent is extended or adjusted under 35 U.S.C. 154(b) by 0 days.

(21) Appl. No.: 15/001,631

(22) Filed: Jan. 20, 2016

(51) Int. Cl.
*B60S 3/04* (2006.01)
*A61G 5/10* (2006.01)

(52) U.S. Cl.
CPC ............... *B60S 3/042* (2013.01); *A61G 5/10* (2013.01); *B60S 3/041* (2013.01)

(58) Field of Classification Search
CPC ... A61G 5/10; B60S 3/041; B60S 1/68; B60S 1/685
USPC .......................................... 15/256.5; 280/855
See application file for complete search history.

(56) References Cited

U.S. PATENT DOCUMENTS

| | | | | |
|---|---|---|---|---|
| 725,843 A * | 4/1903 | Henn | ....................... | A46B 9/02 15/160 |
| 3,231,293 A * | 1/1966 | Loustaunau | .............. | A61G 5/10 15/160 |
| 4,605,239 A * | 8/1986 | Warfel | ....................... | B60S 1/68 15/160 |
| 5,168,660 A * | 12/1992 | Smith | ...................... | B24B 9/007 15/104.04 |
| 5,430,906 A * | 7/1995 | Drury | ................... | B62D 25/182 15/160 |
| 5,515,246 A * | 5/1996 | Maglica | ..................... | B62J 6/00 362/191 |
| 5,566,420 A * | 10/1996 | Specht | .................... | A46B 7/023 15/256.5 |
| 5,857,238 A * | 1/1999 | Jmill | ........................ | B60S 1/68 15/244.1 |
| 5,964,002 A * | 10/1999 | Schaal | .................... | B60S 3/042 15/21.1 |
| 6,434,781 B1 * | 8/2002 | Guerra | .................... | B60S 1/685 15/160 |
| 6,776,698 B2 * | 8/2004 | Pepin | ....................... | B60S 1/68 15/160 |
| 7,360,271 B2 * | 4/2008 | Nordstrom | ................ | B08B 1/04 15/104.05 |
| 8,827,485 B2 * | 9/2014 | Liao | .................... | F21V 21/0885 362/191 |
| 9,067,570 B2 * | 6/2015 | Kueppers | .................. | B60S 1/68 |
| 9,346,438 B1 * | 5/2016 | Parker, III | ................ | B60S 1/68 |
| 9,358,959 B2 * | 6/2016 | Majka | ........................ | B60S 1/68 |
| 2014/0061271 A1 * | 3/2014 | Tate | ........................ | B60R 11/00 224/545 |
| 2014/0284911 A1 * | 9/2014 | Kueppers | .................. | B60S 1/68 280/855 |

(Continued)

*Primary Examiner* — J. Allen Shriver, II
*Assistant Examiner* — Brian Cassidy
(74) *Attorney, Agent, or Firm* — The Law Office of Jerry D. Haynes

(57) ABSTRACT

A wheel brush assembly for use of the wheelchair that includes: a housing; a spring within the housing, where the spring extends from a first end of the housing; a brush that abuts one side of the spring at a first end of the brush; a plurality of bristles on a second end of the brush that extends out of an opening of the housing; and a magnet that enables the attachment of the housing onto a wheel brake. The plurality of bristles come in contact with a wheel of the wheelchair during operation, wherein the spring urges the plurality of bristles into contact with the wheel. Preferably, the plurality of bristles disengages with the wheel upon application of the brake.

4 Claims, 1 Drawing Sheet

(56) References Cited

U.S. PATENT DOCUMENTS

2015/0382489 A1* 12/2015 Sorensen .................. G06F 1/16
  248/558

* cited by examiner

WHEEL BRUSH FOR A WHEELCHAIR

CROSS REFERENCE TO OTHER APPLICATIONS

This application claims priority to U.S. Provisional Application Ser. No. 62/079,669 filed on Nov. 14, 2014.

BACKGROUND OF THE INVENTION

Field of Invention

The present invention relates to a brush that is attachable to a wheelchair to provide a cleaning mechanism for a wheel of the wheelchair.

Description of Related Art

A wheelchair is a device used by an injured or a handicapped individual for mobility purposes. The typical wheelchair includes four wheels where two wheels provide a swivel and steering capability. Two larger wheels are provided to help the seated individual to propel him self or her self in the wheelchair. Wheelchairs typically traverse over various surfaces and as a result the wheels may collect dirt and debris. The collection of dirt and debris on the wheels may make maneuvering the wheelchair difficult and also may damage the wheels. Individuals that use wheelchairs may not be able to clean or maintain wheels as necessary during use. As a consequence, it would be advantageous to have a device that is easily attachable to an existing wheelchair to provide a cleaning or debris removal system for the wheels of the wheelchair. Some cleaning mechanisms have been developed for tires in wheels in the prior art however many of the brushes designed are not effective in removing debris and dirt from the surface of the wheel in an effective manner.

SUMMARY OF THE INVENTION

The present invention relates to a wheel brush assembly for use of the wheelchair comprising: a housing; a spring within the housing, where the spring extends from a first end of the housing; a brush that abuts one side of the spring at a first end of the brush; a plurality of bristles on a second end of the brush that extends out of an opening of the housing; and a magnet that enables the attachment of the housing onto a wheel brake. The plurality of bristles come in contact with a wheel of the wheelchair during operation, wherein the spring urges the plurality of bristles into contact with the wheel. Preferably, the plurality of bristles disengage with the wheel upon application of the brake.

DETAILED DESCRIPTION

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

The present invention relates to a wheel brush assembly that magnetically attaches to an existing wheelchair. The present invention includes a housing that encloses a spring and brush that extends out of an opening of the housing. The brush bristles extend forward out of the housing and where brush is urged to the opening by the spring within the housing. The housing attaches to an existing brake lever of a wheelchair. This system according to the present invention provides an easily mountable and effective brush that cleans the surface of the wheel as the wheel rotates. Once in position the bristles come in contact with the wheel surface and therefore clean the wheel as the wheel rotates.

Figure 1:
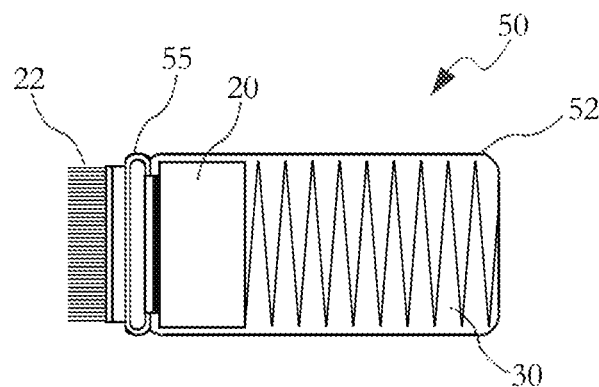
FIG. 1 depicts a wheel brush assembly in accordance with the present invention.

In reference to FIG. 1, a wheel brush Assembly 50 is depicted. The wheel brush Assembly 50 includes a Housing 52 that encloses the components of the wheel brush assembly. Within the housing 52 is a Spring 30 that extends from a first end of the housing 52 and abuts one side of a Brush 20 at an opposing end of the housing 52. The Brush 20 includes Bristles 22 that extend through an Opening 55 provided at the opposing end of the Housing 52. This assembly may be attached to a Brake 42 shown in FIG. 2 of a wheelchair.

Figure 2:
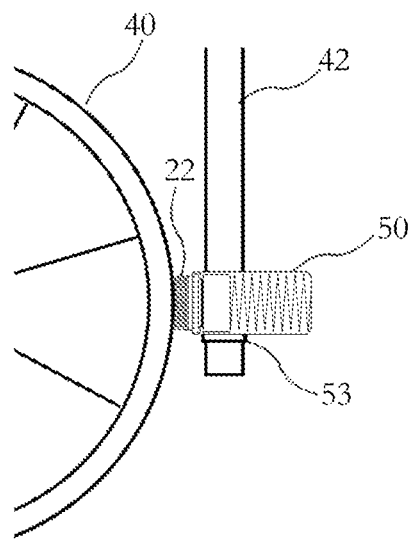
FIG. 2 depicts a use of the wheel brush assembly on a wheel of a wheelchair.

The wheel brush Assembly 50 uses a Magnet 53 that allows the placement of the brush assembly 50 onto the wheel Brake 42. As shown in FIG. 2, Bristles 22 come in contact with the outer surface of a Wheel 40. Therefore as the wheel is turned to maneuver any debris is swiftly brushed away from the surface of the wheel. The bristles of the Brush 20 are removable and allow for the user to slide the bristles off for cleaning and/or replacement. The present system for wheelchair wheel cleaning is a unique compact brush assembly as depicted in the drawings. This brush assembly is applicable onto any existing wheelchair and therefore provides the most effective means to clean and maneuver debris from the surface of a wheel of a wheelchair. The instant invention has been shown and described in what it considers to be the most practical and preferred embodiments. It is recognized, however, that departures may be made there from within the scope of the invention and that obvious modifications will occur to a person skilled in the art.

What is claimed is:

1. A wheel brush assembly for use of the wheelchair comprising:
    a housing;
    a spring within the housing, where the spring extends from a first end of the housing;
    a brush within the housing that abuts one side of the spring at a first end of the brush;
    a plurality of bristles on a second end of the brush that extends out of an opening of the housing; and
    a magnet that enables the attachment of the housing onto a wheel brake.

2. The wheel brush assembly according to claim 1, where the plurality of bristles come in contact with a wheel of the wheelchair during operation.

3. The wheel brush assembly according to claim 1, wherein the spring urges the plurality of bristles into contact with the wheel.

4. The wheel brush assembly according to claim 2, wherein the plurality of bristles disengages with the wheel upon application of the brake.

* * * * *